United States Patent
Yokoyama

(10) Patent No.: US 6,939,176 B2
(45) Date of Patent: Sep. 6, 2005

(54) ELECTRICAL CONNECTOR

(75) Inventor: Hiromasa Yokoyama, Kanagawa (JP)

(73) Assignee: J.S.T. Mfg. Co., Ltd., Osaka (JP)

(*) Notice: Subject to any disclaimer, the term of this patent is extended or adjusted under 35 U.S.C. 154(b) by 0 days.

(21) Appl. No.: 10/486,500
(22) PCT Filed: Sep. 12, 2002
(86) PCT No.: PCT/JP02/09321
§ 371 (c)(1), (2), (4) Date: Feb. 11, 2004
(87) PCT Pub. No.: WO03/026073
PCT Pub. Date: Mar. 27, 2003

(65) Prior Publication Data
US 2004/0209519 A1 Oct. 21, 2004

(30) Foreign Application Priority Data
Sep. 13, 2001 (JP) .......................... 2001-278487

(51) Int. Cl.⁷ ............................................. H01R 23/70
(52) U.S. Cl. ........................................................ 439/630
(58) Field of Search .......................... 439/66, 862, 630, 439/733.1, 155, 159, 153; 361/737, 752; 235/492

(56) References Cited

FOREIGN PATENT DOCUMENTS

| EP | 96/14671 A1 | 5/1996 |
| EP | 0926769 A1 | 6/1999 |
| EP | 0930577 A1 | 7/1999 |
| EP | 0949724 A2 | 10/1999 |
| JP | 52-74459 U1 | 12/1975 |

OTHER PUBLICATIONS

English Translation of the International Preliminary Examination Report (Dated Dec. 3, 2003).

Primary Examiner—Alexander Gilman
(74) Attorney, Agent, or Firm—Rader, Fishman & Grauer PLLC

(57) ABSTRACT

An electrical connector includes a connector housing 2 for receiving and retaining a memory card, and connecting terminals 4a to 4f fixed to the connector housing 2. Some of the connecting terminals 4a, 4c, 4e are each connected with a circuit board at least 2 portions thereof (such as, 41a and 42a), the circuit board on which the electrical connector is mounted. This ensures a stable connection between the electrical connector and the circuit board and hence, the electrical connector will not encounter easy lift-off from the circuit board in spite of plural times of insertion/removal of the memory card (FIG. 1).

6 Claims, 4 Drawing Sheets

ELECTRICAL CONNECTOR

TECHNICAL FIELD

The present invention relates to an electrical connector mounted to a circuit board disposed in an apparatus body such as of a cellular phone and adapted to retain a memory card, thereby establishing electrical connection between the memory card and a circuit component in the apparatus body.

BACKGROUND ART

There has been known an electrical connector for establishing connection between a user-installable external memory card and a circuit component in an apparatus body such as of a cellular phone.

The electrical connector includes a connector housing formed of a resin and accommodating the memory card, and a plurality of metal contacts (connecting terminals) fixed in the connector housing as one piece.

Respective one end of the connecting terminals in the connector housing is connected with each electrode of the circuit board in the apparatus body by means of solder or the like. When the memory card is inserted in the connector housing in this state, terminals of the memory card come into contact with predetermined portions of the connecting terminals in the connector housing (such as bellows-folded portions). Thus is established the electrical connection between the memory card and the circuit component in the apparatus body.

Mechanical connection between the circuit board in the apparatus body and the connector housing is established by means of the solder provided at the respective one end of the connecting terminals (That is, the soldered portions serve the dual purposes of establishing the electrical connection and the mechanical connection).

However, opposite ends of the connecting terminals from their individual ends connected with the circuit board in the apparatus body are in a free state as fixed nowhere. Hence, the arrangement involves a fear that plural times of insertion and removal of the memory card may cause fatigue of the aforesaid connected portions so that the connecting terminals and the connector housing integral therewith may be lifted off from the circuit board in the apparatus body.

As a countermeasure against such a lift-off of the connector housing, for example, it may be contemplated to establish a zigzag connection between the connecting terminals and the circuit in the apparatus body, the connection in which a respective pair of adjoining connecting terminals are connected alternately at the one end and the other end thereof. However, such a zigzag connection leads to a difficult circuit-pattern layout in the apparatus body, hindering the downsizing of the apparatus.

In view of the foregoing, it is an object of the invention to provide an electrical connector adopting a simplified construction such that the electrical connector mounted in the apparatus body may be prevented from encountering lift-off from the circuit board in the apparatus body.

DISCLOSURE OF THE INVENTION

An electrical connector according to the invention comprises a connector housing for receiving and retaining a memory card, and a connecting terminal fixed in the connector housing, and is characterized in that the connecting terminal has a portion capable of electrically contacting the memory card retained by the connector housing, and includes at least 2 portions connected with a circuit board to which the electrical connector is mounted.

According to the arrangement, the connecting terminal is connected with the circuit board at least at the 2 portions thereof. Thus is provided the electrical connector which is stably connected with the circuit board and does not encounter easy lift-off from the circuit board in spite of plural times of insertion/removal of the memory card.

In another aspect of the invention, a plurality of the connecting terminals may be fixed in the connector housing while at least one of the fixed terminals may include at least 2 portions connected with the circuit board. While a plurality of the above connecting terminals are normally provided in the electrical connector, at least one of the connecting terminals need to have the structure according to claim 1 in order to achieve the object of the invention. As a matter of course, more of the connecting terminals (e.g., a half thereof) may have the structure according to claim 1.

The connecting terminal may include at least 2 portions connected with the circuit board to which the electrical connector is mounted, the 2 portions located in anteroposterior relation with respect to the portion capable of electrically contacting the memory card. Unlike the conventional cantilevered structure, the above structure permits the connecting terminal to be connected with the circuit board via the portions on the opposite sides of the portion capable of electrically contacting the memory card. This further enhances the stable and positive connection between the connecting terminals and the circuit board. Therefore, the electrical connector is less susceptible to easy lift-off from the circuit board associated with plural times of insertion/removal of the memory card.

BRIEF DESCRIPTION OF THE DRAWINGS

FIG. 1A is a top plan view showing an electrical connector 1 according to the invention, whereas FIG. 1B is a sectional view taken on the line X—X in FIG. 1A;

FIG. 3A is a top plan view showing a first connecting terminal, whereas FIG. 3B is a side view thereof.

BEST MODE FOR CARRYING OUT THE INVENTION

A mode for carrying out the invention will hereinbelow be described in details with reference to the accompanying drawings.

Figure 1:
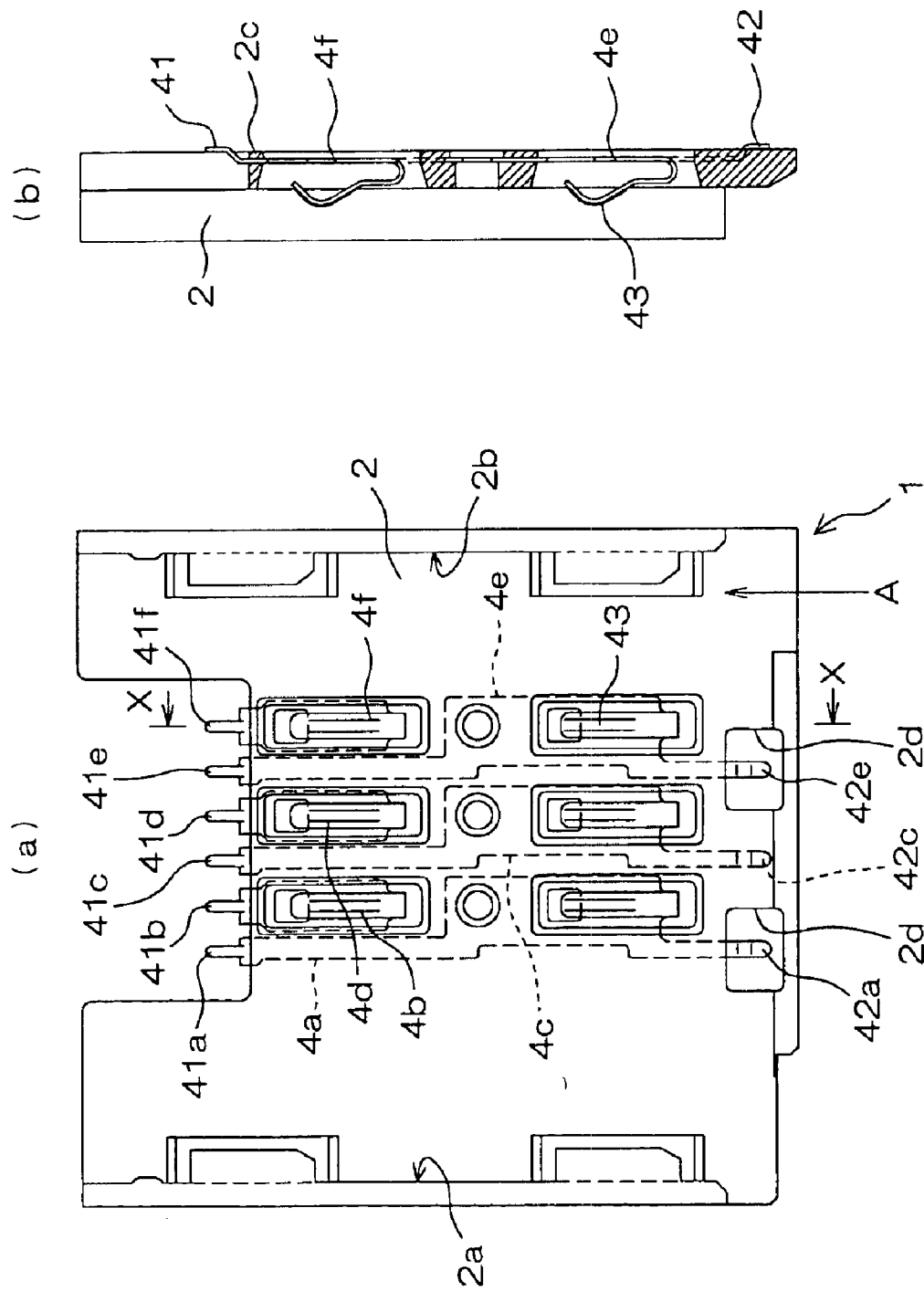
Figure 2:
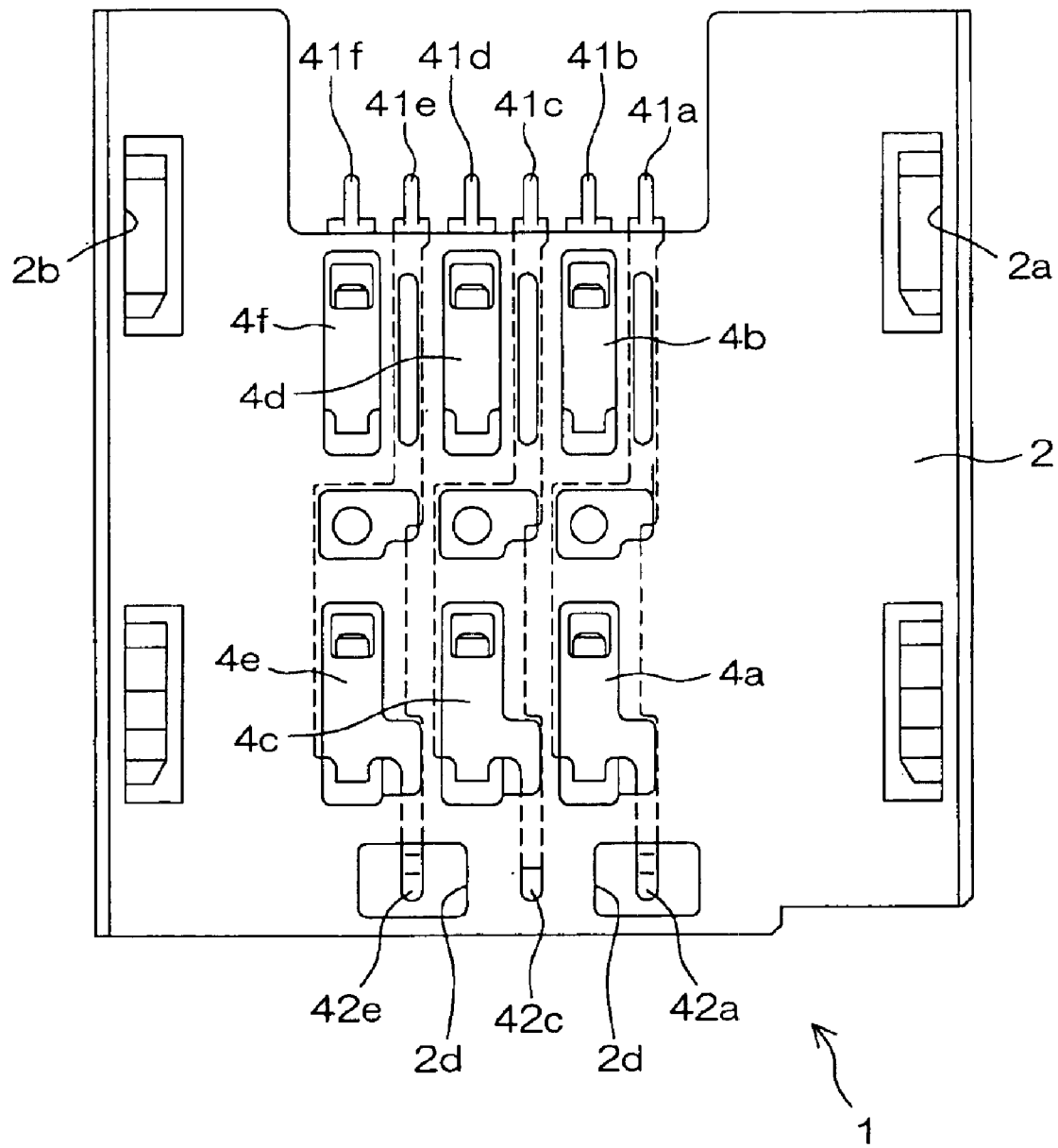
FIG. 2 is a bottom plan view showing the electrical connector 1 of the invention.
Figure 3:
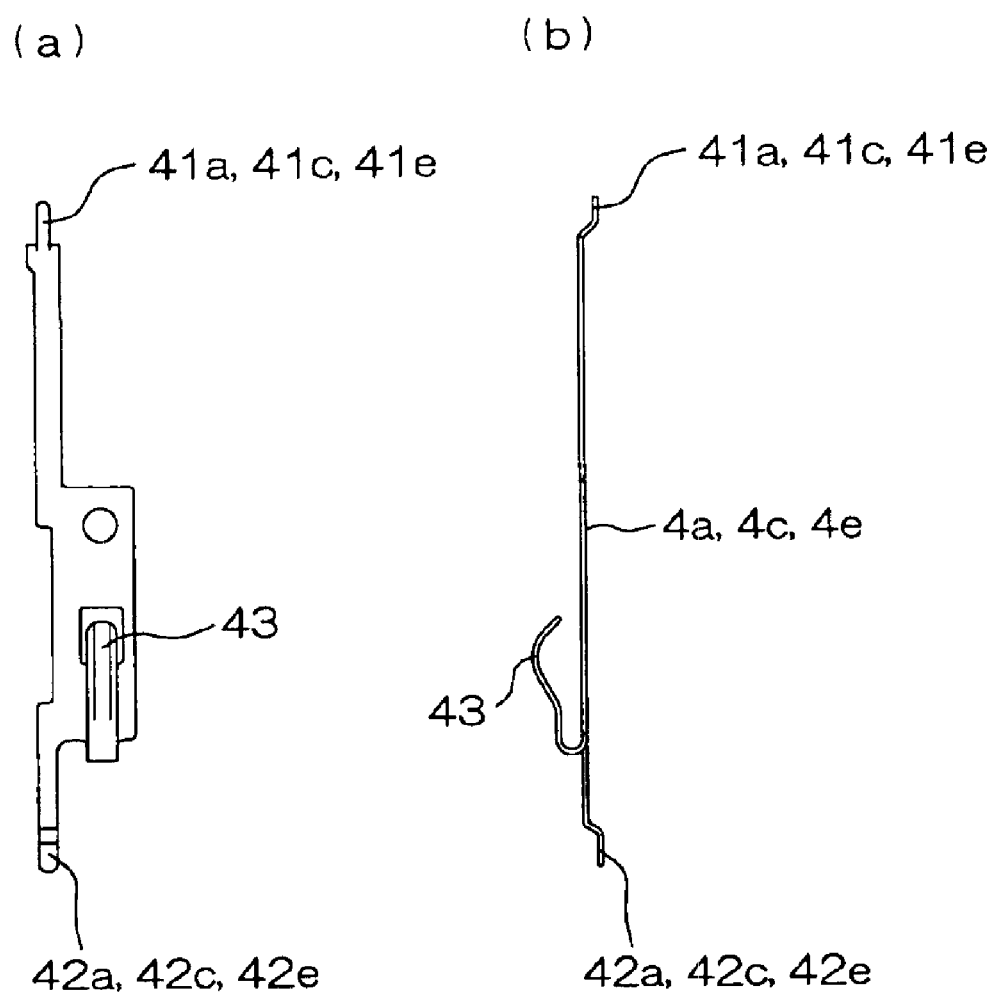

FIG. 1A is a top plan view showing an electrical connector 1 of the invention, whereas FIG. 1B is a sectional view thereof. FIG. 2 is a bottom plan view showing the electrical connector 1 of the invention. FIG. 3A is a top plan view showing a first connecting terminal, whereas FIG. 3B is a sectional view thereof.

The electrical connector 1 is molded from an insulating plastic material with metal connecting terminals inserted therein. A portion consisting of the plastic material is referred to as a connector housing 2.

Figure 4:
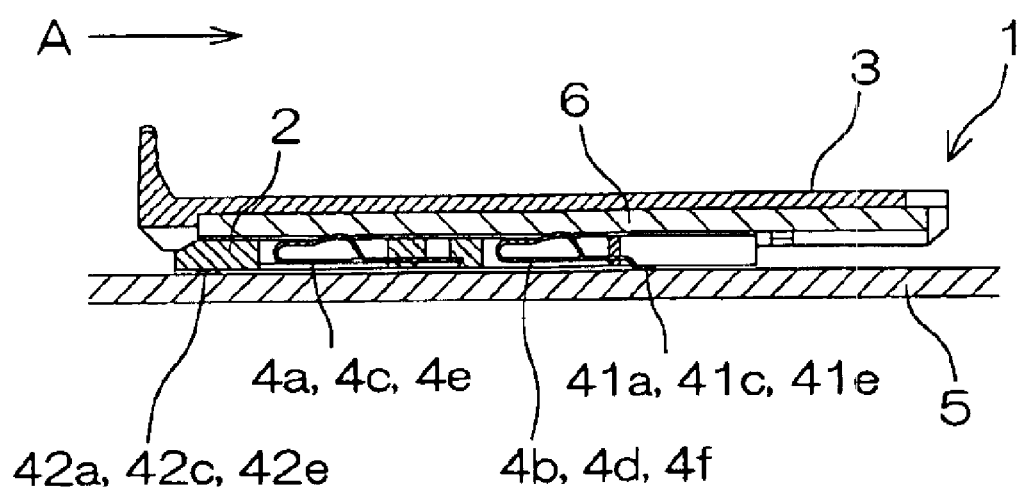
FIG. 4 is a sectional view showing the electrical connector 1 under service condition.

The connector housing 2 is formed in the shape of a flat plate, which is formed with grooves 2a, 2b on opposite sides thereof for guiding the insertion of a card holder 3 (see FIG. 4). The card holder 3 retains a memory card 6 (see FIG. 4) such as a SIM (Subscriber Identity Module) card.

The connector housing 2 has 6 connecting terminals 4a to 4f mounted to one side thereof. Exposed portions at proximal ends of the connecting portions 4a to 4f (the upper side as seen in FIG. 1) are folded to define respective steps for connection with a circuit board in an apparatus body (hereinafter, the folded portions will be referred to as "proximal connecting portions 41a to 41f" or collectively as a "proximal connecting portion 41"). The proximal connecting portions 41a to 41f are cream-soldered to metal terminals of a circuit board 5 (see FIG. 4). Besides the soldering, any other method such as ultrasonic depositioning may be used to bond the connecting portions to the metal terminals.

The connecting terminals 4a to 4f are classified into two types including first connecting terminals 4a, 4c, 4e and second connecting terminals 4b, 4d, 4f. The first and second connecting terminals are alternately arranged in the connector housing 2. The first connecting terminals 4a, 4c, 4e are formed in such a length as to reach a lower side of the connector housing 2 (the lower side as seen in FIG. 1), whereas the second connecting terminals 4b, 4d, 4f are formed in about a half the length of the first connecting terminals 4a, 4c, 4e.

As shown in the sectional view (FIG. 1B), the second connecting terminals 4b, 4d, 4f have their portions close to the proximal connecting portions 41b, 41d, 41f embedded in a resin 2c of the connector housing 2 so as to be retained by the connector housing. The second connecting terminals have their distal ends folded in a bellows shape.

In contrast, the first connecting terminals 4a, 4c, 4e are retained by the connector housing 2 as mostly embedded in the resin 2c of the connector housing except for the proximal connecting portions 41a, 41c, 41e and distal connecting portions thereof (to be described hereinlater), as shown in the top plan view (FIG. 1A).

The first connecting terminals 4a, 4c, 4e each have a portion 43 thereof folded in the bellows shape, the folded portion extending from place about ¾ of the overall length of the connecting terminal from the proximal end thereof. As shown in the side views of FIGS. 1B and 3B, projecting portions defined by distal ends of unfolded base metal portions of the first connecting terminals are so folded as to define respective steps to be soldered to the circuit board, similarly to the afore said proximal connecting portion 41. The folded projecting portions at the distal ends will hereinafter be referred to as "distal connecting portions 42a, 42c, 42e" or collectively as a "distal connecting portion 42". The distal connecting portion 42a and the proximal connecting portion 41a are located in an anteroposterior relation with respect to an insertion direction A (see FIG. 1A). The distal connecting portion 42c and the proximal connecting portion 41c are also located in the anteroposterior relation with respect to the insertion direction A. The distal connecting portion 42e and the proximal connecting portion 41e are also located in the anteroposterior relation with respect to the insertion direction A.

The bellows-shape portions of the 6 connecting terminals 4a to 4f are all folded in a direction parallel to the insertion direction A of the memory card. A fold-back of the bellows shape is located on a side from which the memory card is inserted.

The distal connecting portions 42a, 42e of the first connecting terminals 4a, 4e on the laterally opposite sides are folded as exposed from respective windows 2d formed in the connector housing 2. On the other hand, the first connecting terminal 4c, located centrally between the above first connecting terminals, is not provided with a window. This is because if all the connecting terminals 4a, 4c, 4e are to be exposed, the connector housing 2 must be formed with 3 sequential windows for exposing the terminals, which in turn, reduce the strength of the connector housing 2. However, as seen in the bottom plan view (FIG. 2), the distal connecting portion 42c of the central first connecting terminal 4c is also folded to be exposed from a bottom surface of the connector housing 2, thus adapted to be connected with the circuit board.

FIG. 4 is a sectional view showing the electrical connector 1 under service condition. The insertion direction of a card is represented by an arrow A. The electrical connector 1 has the proximal connecting portion 41 and the distal connecting portion 42 thereof connected with the metal terminals of the circuit board 5, thereby being fixed to the circuit board 5 in the apparatus body. The metal terminal of the circuit board 5 in connected relation with the proximal connecting portion 41 must be connected with a circuit component of the apparatus body, whereas the metal terminal in connected relation with the distal connecting portion 42 may not necessarily be connected with a circuit component of the apparatus body or may be electrically isolated from the others. This is because an electrical connection established at one place of the connecting terminal fully serves the purpose. Conversely, an arrangement may be made such that the metal terminal of the circuit board 5 in connected relation with the distal connecting portion 42 is connected with the circuit component of the apparatus body while the metal terminal in connected relation with the proximal connecting portion 41 is not connected with the circuit component of the apparatus body.

When the card holder 3 retaining the SIM card 6 is inserted into the connector housing 2 of the electrical connector 1 having the above structure, a terminal portion of the SIM card 6 comes into contact with the respective bellows-folded portions of the first and second connecting terminals 4a to 4f so that the electrical connection is established between the SIM card and the circuit of the apparatus body. Thus, the apparatus body is allowed to function.

The first connecting terminals 4a, 4c, 4e have not only their proximal connecting portions 41a, 41c, 41e but also their distal connecting portions 41a, 42c, 42e connected with the circuit board. Furthermore, the first connecting terminals 4a, 4c, 4e are retained by the connector housing as embedded in the resin thereof. Therefore, the connector housing 2 itself is prevented from encountering lift-off from the circuit board 5.

Although the second connecting terminals 4b, 4d, 4f have the conventional cantilevered bellows structure, they are believed to cause no problem because the first connecting terminals 4a, 4c, 4e prevent the connector housing 2 from being lifted off from the circuit board.

While the mode of carrying out the invention has been fully described, it is to be noted that the implementation of the invention is not limited to the foregoing mode of the invention but various changes or modifications may be made thereto within the scope of the invention.

What is claimed is:

1. An electrical connector mounted to a circuit board in an apparatus body and retaining a memory card thereby establishing electrical connection between the memory card and a circuit component in the apparatus body, the electrical connector comprising a connector housing for receiving and retaining the memory card, and a connecting terminal fixed in the connector housing, the connecting terminal including an elongated body member having a proximal connecting portion, a distal connecting portion, a bellows-shaped folded portion and an intermediate portion having a first surface and an opposite second surface, the proximal connecting portion connected to and extending from first surface of the intermediate portion at one end thereof in a stepped down manner and the distal connecting portion connected to and extending from the first surface of the intermediate portion at an opposite end thereof in a stepped down manner with the proximal connecting portion and the distal connecting portion being aligned with one another along a longitudinal axis, the intermediate portion including a generally rectangular section disposed offset relative to the longitudinal axis, the bellows-shaped folded portion projecting from the second surface and connected to the generally rectangular section, wherein the bellows-shaped folded portion being capable of electrically contacting the memory card retained by the connector housing, and the proximal connecting portion and the distal connecting portion being connected with the circuit board to which the electrical connector is mounted.

2. An electrical connector according to claim 1, wherein a plurality of the connecting terminals are fixed in the connector housing and at least one of the connecting terminals includes the proximal connecting portion and the distal connecting portion being connected with the circuit board.

3. An electrical connector according to claim 1 or 2, wherein the connecting terminal includes the proximal connecting portion and the distal connecting portion being connected with the circuit board to which the electrical connector is mounted.

4. A connecting terminal, comprising:

an elongated body member having a proximal connecting portion, a distal connecting portion, a bellows-shaped folded portion and an intermediate portion having a first surface and an opposite second surface, the proximal connecting portion connected to and extending from first surface of the intermediate portion at one end thereof in a stepped down manner and the distal connecting portion connected to and extending from the first surface of the intermediate portion at an opposite end thereof in a stepped down manner with the proximal connecting portion and the distal connecting portion being aligned with one another along a longitudinal axis, the intermediate portion including a generally rectangular section disposed offset relative to the longitudinal axis, the bellows-shaped folded portion projecting from the second surface and connected to the generally rectangular section.

5. A connecting terminal according to the claim 4, wherein the proximal connecting portion and the distal connecting portion are disposed in a common first plane and the intermediate portion is disposed in a second plane extending parallel to the common first plane.

6. An electrical connector according to claim 1, wherein the proximal connecting portion and the distal connecting portion are disposed in a common first plane and the intermediate portion is disposed in a second plane extending parallel to the common first plane.

* * * * *